US010281986B2

(12) United States Patent
Howard et al.

(10) Patent No.: US 10,281,986 B2
(45) Date of Patent: May 7, 2019

(54) METHODS, CONTROLLERS AND COMPUTER PROGRAM PRODUCTS FOR ACCESSIBILITY TO COMPUTING DEVICES

(71) Applicant: Georgia Tech Research Corporation, Atlanta, GA (US)

(72) Inventors: Ayanna Howard, Atlanta, GA (US); Brett Berry, Alpharetta, GA (US); Justin Nicholas Devenish, Acworth, GA (US); Po Kai Hsu, Atlanta, GA (US); Tiffany Jernigan, Bellevue, WA (US); William Johnston, Washington, DC (US); Hae Won Park, NUSorcross Norcross, GA (US); Giancarlo Valentin, Bayamon, PR (US); Siu Chuen Yau, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 362 days.

(21) Appl. No.: 14/397,894

(22) PCT Filed: May 2, 2013

(86) PCT No.: PCT/US2013/039230
§ 371 (c)(1),
(2) Date: Oct. 30, 2014

(87) PCT Pub. No.: WO2013/166261
PCT Pub. Date: Nov. 7, 2013

(65) Prior Publication Data
US 2015/0138068 A1    May 21, 2015

Related U.S. Application Data

(60) Provisional application No. 61/642,200, filed on May 3, 2012.

(51) Int. Cl.
G06F 3/01        (2006.01)
G06F 3/0488   (2013.01)
G06F 3/041      (2006.01)

(52) U.S. Cl.
CPC .............. G06F 3/017 (2013.01); G06F 3/016 (2013.01); G06F 3/0414 (2013.01); G06F 3/04883 (2013.01)

(58) Field of Classification Search
CPC ..... G06F 3/016; G06F 3/0414; G06F 3/04883
See application file for complete search history.

(56) References Cited

U.S. PATENT DOCUMENTS 7,810,750 B2    8/2010  Abreu
9,244,562 B1 *  1/2016  Rosenberg .......... G06F 3/04847
(Continued)

FOREIGN PATENT DOCUMENTS

WO    WO 2010/147497 A1    12/2010
WO    WO 2011130752 A1     10/2011

OTHER PUBLICATIONS

Kouki et al., "Musicglove: A Wearable Musical Controller for Massive Media Library," NIME08, Genova, Italy 2008.
(Continued)

*Primary Examiner* — Patrick N Edouard
*Assistant Examiner* — Douglas M Wilson
(74) *Attorney, Agent, or Firm* — Myers Bigel, P.A.

(57) ABSTRACT

Methods of providing user accessibility to an electronic device are provided. Methods include receiving a physical input via at least one user input device in a user interface, generating, in the user interface, a sensor output signal responsive to receiving the physical input from the user, and interpreting the sensor output signal as a gesture input signal that that is received by the electronic device. The gesture input signal is operative to cause the electronic device to
(Continued)

perform a function corresponding to a gesture that is physically applied to the electronic device.

20 Claims, 8 Drawing Sheets

(56) References Cited

U.S. PATENT DOCUMENTS

| | | |
|---|---|---|
| 2004/0145576 A1 | 7/2004 | Zondag |
| 2007/0200863 A1* | 8/2007 | Guzman .............. G06F 3/011 345/581 |
| 2009/0027353 A1 | 1/2009 | Im et al. |
| 2009/0327171 A1* | 12/2009 | Tan .................... G06F 3/015 706/12 |
| 2010/0063779 A1* | 3/2010 | Schrock ............... A43B 3/00 702/188 |
| 2011/0040658 A1 | 2/2011 | Gautier et al. |
| 2011/0241997 A1 | 2/2011 | Gautier et al. |
| 2011/0148796 A1 | 6/2011 | Hollemans et al. |
| 2011/0199295 A1* | 8/2011 | Chen ................... G06F 3/0383 345/156 |
| 2011/0199393 A1* | 8/2011 | Nurse .................. A43B 3/00 345/665 |
| 2011/0210917 A1* | 9/2011 | LaFave ............. G06F 3/04845 345/160 |
| 2012/0062445 A1 | 3/2012 | Haddick |
| 2012/0249475 A1* | 10/2012 | Murphy .............. G06F 1/1694 345/174 |
| 2012/0268587 A1* | 10/2012 | Robbins ............. G05D 1/0016 348/114 |
| 2012/0306804 A1* | 12/2012 | Chen ................... G06F 3/0416 345/174 |
| 2013/0154998 A1* | 6/2013 | Yang .................. H03K 17/9625 345/174 |
| 2017/0075429 A1* | 3/2017 | Bromer ................ G06F 3/044 |

OTHER PUBLICATIONS

International Preliminary Report on Patentability Corresponding to International Application No. PCT/US2013/039230; dated Nov. 13, 2014; 16 Pages.
International Search Report Corresponding to International Application No. PCT/US2013/039230, dated Sep. 13, 2013; 3 Pages.
Couto, Magic Cube—Virtual Laser Keyboard. 2011. Retrieved on Aug. 23, 2013. Retrieved from the Internet at URL http://www.paranoias.org/2011/07/magic-cube-virtual-laser-keyboard/.
Perez, Using an Apple Wireless Keyboard with VoiceOver on the iPad. 2011. Retrieved on Aug. 23, 2013. 1 Page, Retrieved from the Internet at URL https://www.youtube.com/watch?v=J46ZbjzdNcQ.
Tysiphonehelp. Sphero: iPhone controlled Robotic Ball—CES 2012. Jan. 11, 2012. Retrieved on Aug. 23, 2013. 1 Page, Retrieved from the Internet at URL http://www.youtube.com/watch?v=6_QYDn2yfuc.

* cited by examiner

METHODS, CONTROLLERS AND COMPUTER PROGRAM PRODUCTS FOR ACCESSIBILITY TO COMPUTING DEVICES

RELATED APPLICATIONS

This application claims priority to U.S. Provisional Application Ser. No. 61/642,200, filed May 3, 2012, and PCT Application No. PCT/US2013/039230; filed May 2, 2013, the disclosures of which are hereby incorporated by reference in its entirety.

STATEMENT OF GOVERNMENT SUPPORT

This invention was made with government support under contract number CNS-0940146 awarded by the National Science Foundation. The United States Government has certain rights in this invention.

BACKGROUND

With the growing availability of mobile devices, individuals may be increasingly exploring the expanding world of mobile applications, games, and social networks. For example, tablet computers may be used to engage children, with and without disabilities, in learning activities through an attractive and easy to use interface and design corresponding to such tablet computers.

Tablet computers may now be equipped with a variety of assets including intuitive user interfaces such as touchscreen, wireless connectivity via multiple different protocols such as Wi-Fi and Bluetooth, image capture capabilities, position sensing and/or location determination capabilities. A variety of applications have been introduced that capitalize on the widespread acceptance of tablet computers, which may, in part, be due to the general affordability. For example, some applications may be operable to offer assistance to individuals with speech difficulties by allowing them to create verbal words and/or phrases by pressing a series of images using a tablet device. Similarly some applications may be operable to combine an interactive drawing application with a robot or other device that may provide feedback based on a user's input sequence. Accessible messages may provide assistive text typing by highlighting keyboard elements as a user types by predicting the next sequence of letters or characters.

Unfortunately, such touch-based tools may be developed assuming that the user possesses fine motor skills and thus is capable of touching small specific regions with an appropriate level of intensity and timing. However, the assumption of fine motor skills may be unwarranted in the context of individuals having limited upper body motor control, including for example, in children with cerebral palsy (CP). For example, children with CP may sustain dysfunctions in upper extremity (UE) activities, such as reaching, grasping and manipulation. Current therapeutic interventions for UE control in children have emphasized repeated practice of functional activities in various contexts with sufficient feedback. However children with CP may have difficulty in accessing devices requiring fine motor control such as, for example, a common pinch and swipe gesture operations that may be used to interface with a tablet computer.

SUMMARY

Some embodiments of the present invention are directed to an apparatus for providing accessibility to an electronic device. According to some embodiments, the apparatus may include multiple user input devices, ones of which are configured to receive a physical input from a user and to generate a sensor output signal responsive to receiving the physical input from the user. A processing device may be configured to receive one or more of the sensor output signals and to interpret the one or more received sensor output signals as a gesture input signal that is received by the electronic device. A sensor module may include an interface housing that is configured to receive the user input devices. A sensor module may also be embedded within an item worn by the user or integrated with another external input device used by the user.

In some embodiments, ones of the user input devices include a force sensitive input device that is configured to provide the respective sensor output signal as a variable value that corresponds to an amount of physical input force applied to the force sensitive input device by the user. Some embodiments provide that the force sensitive device includes a force sensitive resistor that is configured to have an electrical resistance that changes responsive to changes in physical force applied thereto.

Some embodiments include a voltage divider circuit that includes the force sensitive resistor therein and that is coupled to an analog input of the processing device. As the physical force is applied to the force sensitive resistor a voltage value applied to the analog input of the processing device coupled to the divider changes responsive thereto.

Some embodiments include an adjustable sleeve that is configured to be worn on a user's upper limb or wrapped around a user's lower limb, and that supports the sensor module and the processing device. Some embodiments include a housing that is configured to be placed within a garment worn by the user and/or placed within a cushion that the user places their limb on and/or placed solitarily on a surface.

In some embodiments, the interface housing includes a curved base and multiple openings that are configured to receive corresponding ones of the user input devices or other general-purpose input devices, such as joysticks, track-balls, slam switches, sip and/or puff switches. Some embodiments provide that the housing includes openings that enable the user input devices to be mounted within the interface housing. Some embodiments include fittings that enable corresponding ones of the user input devices to fit together to create a joined contact surface of the same height.

Some embodiments include wireless communication transmitter(s) that may be communicatively coupled to the processing device and that are configured to wirelessly transmit the gesture input signal to be received by the electronic device. In some embodiments, the user input devices include multiple input devices, such as a first input device to detect a first value and a second input device to detect a second value, and the processing device to uniquely detect values generated independently by each device. The processing device may include logic to detect a first user input that corresponds to the first value exceeding a threshold value and a second user input that corresponds to the second value exceeding the threshold value and logic to generate a swipe gesture input signal responsive to detecting that the first user input and the second user input are detected in sequence. In some embodiments, the swipe gesture input signal includes a forward swipe gesture input signal responsive to the first user input being detected before the second user input and the swipe gesture input signal includes a backward swipe gesture input signal responsive to the second user input being detected before the first user input.

Some embodiments provide that the user input devices include a first input device and a second input device, and the processing device includes a first input to detect a first value generated by the first input device and a second input to detect a second value generated by the second input device. The processing device may include logic to detect a first user input that corresponds to the first value exceeding a threshold value and a second user input that corresponds to the second value exceeding the threshold value and logic to generate a first function selection gesture input signal responsive to detecting that the first user input is detected. The processing device may include logic to generate a second function selection gesture input signal responsive to detecting that the second user input is detected, logic to estimate a time interval between at least two of a first user input start time, a second user input start time, a first user input stop time and a second user stop time. In some embodiments, the logic is configured to identify whether the first user input and the second user input correspond to an input sequence.

Some embodiments include multiple feedback devices corresponding to the user input devices. The feedback devices may provide a tactile feedback to a user corresponding to receiving the physical input from the user. The feedback devices may also include a vibration or sound feedback to a user corresponding to receiving the physical input from the user.

In some embodiments, the electronic device comprises a computer tablet device that is configured to wirelessly receive the gesture input signal. The computer tablet device may include computer readable program code stored therein that, when executed by a processor in the computer tablet device, interprets the received gesture input signal to control the computer tablet device.

Some embodiments of the present invention are directed to a computer program product that includes a computer readable storage medium having computer readable program code embodied in the medium. The computer readable program code may generate, in an electronic device, a graphical user interface that visually corresponds to an arrangement of multiple user input devices in a wearable user interface that interprets user interaction with the wearable user interface as gesture input signals received by the electronic device. The computer readable code may interpret received gesture input signals to control the electronic device via the graphical user interface.

In some embodiments, the user interface includes an array of the user input devices arranged in an input layout pattern and the computer readable code generates the graphical user interface as a graphical representation that includes the input layout pattern.

Some embodiments provide that the computer readable code interprets that the gesture input signal corresponds to actuation of one of the user input devices and further includes computer readable code to execute an operation that corresponds to the one of the user input devices. Some embodiments provide that the computer readable code interprets that the gesture input signal corresponds to a sequence of actuation of more than one of the user input devices, the sequence being interpreted as a swipe gesture, and further includes computer readable code to execute an operation that corresponds to the swipe gesture.

In some embodiments, an order of the actuation of the more than one of the input devices identifies the sequence as corresponding to either a forward swipe or a reverse swipe. Some embodiments provide that the user input devices in the user interface include multiple user input devices that are arranged in a row in the user interface. The graphical user interface may visually corresponds to the arrangement of the user input devices in the user interface by generating a graphical representation of rows of graphically generated buttons, each of the rows of graphically generated buttons including graphically generated buttons corresponding to the quantity of user input devices. The computer readable code may change which of the rows of graphically generated buttons is highlighted responsive to a swipe gesture.

Some embodiments include computer readable code to generate mobile device commands that are responsive to gesture input signals received by the electronic device and that are configured to be received by a remote mobility device that is operable to move responsive to receipt of the mobile device commands. In some embodiments, the remote mobility device includes a robot and the graphical user interface includes a robot control application.

Some embodiments of the present invention are directed to systems for providing accessibility to an electronic device. Such systems may include a wireless user interface for providing accessibility to the electronic device. The wireless user interface may include multiple user input devices, ones of which are configured to receive a physical input from a user and to generate a sensor output signal responsive to receiving the physical input from the user. A processing device may be configured to receive one or more of the sensor output signals and to interpret the one or more received sensor output signals as a gesture input signal that is received by the electronic device. An interface housing that is configured to receive the user input devices and a computer program product that includes a computer readable storage medium having computer readable program code embodied in the medium. The computer code may include computer readable code to generate, in the electronic device, a graphical user interface that visually corresponds to an arrangement of the user input devices in a wireless user interface that interprets user interaction with the wireless user interface as gesture input signals received by the electronic device. Computer readable code may interpret received gesture input signals to control the electronic device via the graphical user interface.

Some embodiments of the present invention are directed to methods of providing user accessibility to an electronic device. Such methods may include receiving a physical input via at least one user input device in a user interface, generating, in the user interface, a sensor output signal responsive to receiving the physical input from the user, and interpreting the sensor output signal as a gesture input signal that is received by the electronic device, the gesture input signal being operative to cause the electronic device to perform a function corresponding to a gesture that is physically applied to the electronic device.

In some embodiments, generating the sensor output signal includes generating a variable value that corresponds to an amount of physical input force applied to the at least one user input device. Some embodiments provide that the at least one user input device includes a force sensitive resistor that is configured to have an electrical resistance that changes responsive to changes in physical force applied thereto.

Some embodiments include wirelessly transmitting the gesture input signal from the user interface to the electronic device.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION

Figure 1:
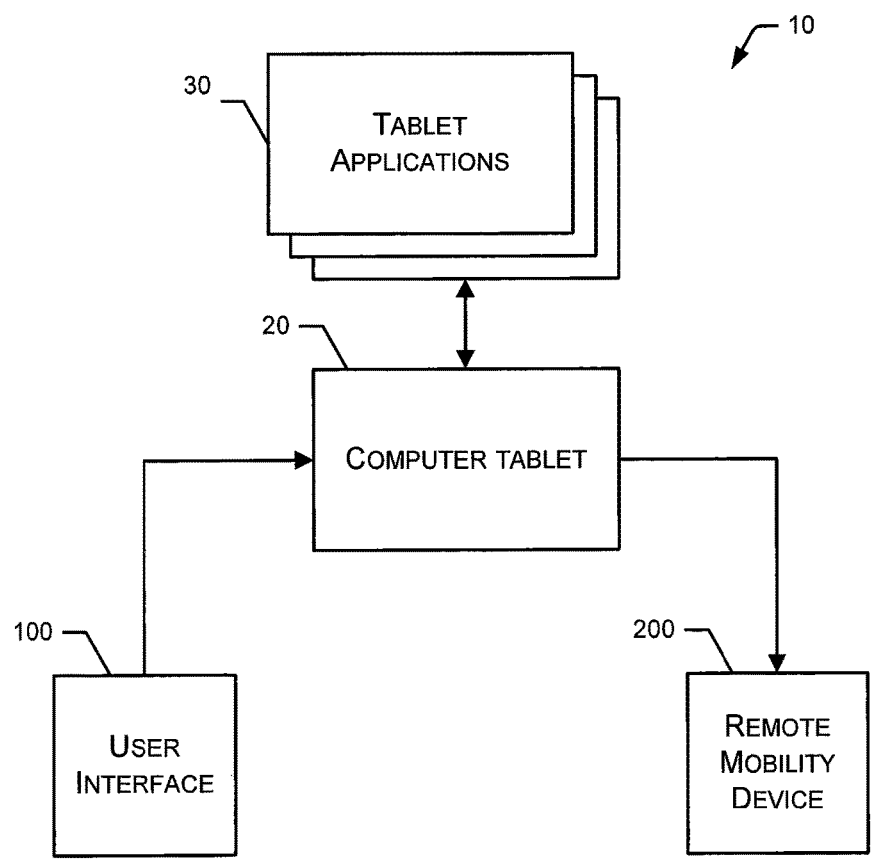
FIG. 1 is a block diagram illustrating a system for providing accessibility to an electronic device according to some embodiments of the present invention.

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, embodiments of the present invention may take the form of a computer program product on a computer-usable or computer-readable non-transient storage medium having computer-usable or computer-readable program code embodied in the medium for use by or in connection with an instruction execution system.

The computer-usable or computer-readable medium may be, for example but not limited to, an electronic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Reference is now made to FIG. 1, which is a block diagram illustrating a system for providing accessibility to an electronic device according to some embodiments of the present invention. In some embodiments, a system 10 as disclosed herein may provide accessibility to an electronic device, such as, for example a computer tablet 20 for individuals having reduced fine motor functionality. A system 10 may include a user interface 100 that may receive a physical input from a user and that may generate a gesture input signal that may be received by the computer tablet 20 for controlling tablet applications 30 that are configured to execute thereon. Although examples discussed herein may include a computer tablet 20, any electronic device including a processor may be used herein. For example, an electronic device may include a desktop and/or stationary computer, or a mobile terminal, a computing/processing device such as a wireless phone, a personal digital assistant, a smart phone, a tablet computing device, and/or other portable computing device.

In some embodiments, the user interface 100 may be a wireless interface that is configured to transmit gesture input signals to the computer tablet 20 via one or more wireless communication protocols. For example, the user interface may transmit data using operations in any of the following radio access technologies: Bluetooth, Bluetooth 4.0, GSM, code division multiple, access (CDMA), wideband-CDMA, CDMA2000, Universal Mobile Telecommunications System (UMTS), Third Generation Partnership Project (3GPP) Long Term Evolution (LTE), Wi-Fi, and/or WiMAX, among others. In some embodiments, the user interface 100 may be configured to transmit gesture input signal data to the computer tablet 20 using one or more different wired data communication paths exclusively and/or in combination with one or more of the wireless communication protocols.

The user interface 100 may provide access and control of the computer tablet 20, including multiple different tablet applications 30 that are configured to run on the computer tablet 20. In some embodiments, the tablet applications 30 may include games such as memory matching games, a control interface for remote mobility device 200, such as, for example a portable robot, and speech communication assistant that may be used to assist users with speech limitations to communicate by selecting common words from an easily navigable menu. Tablet applications 30 may include computer readable code that is configured to generate a graphical user interface in the computer tablet 20. Some embodiments provide that the graphical user interface may visually correspond to an arrangement of user input devices in the user interface. Tablet applications 30 may further include computer readable code that is configured to interpret received gesture input signals to control the computer tablet 20 via the graphical user interface.

Figure 2:
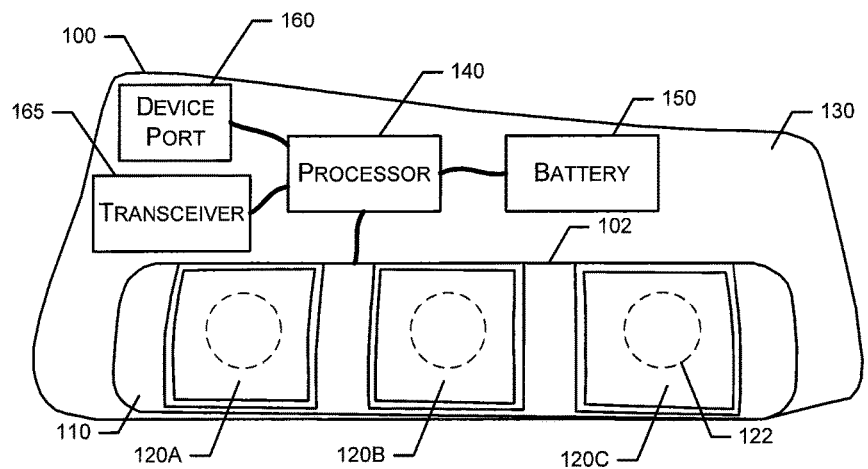
FIG. 2 is a top schematic view of an apparatus for providing accessibility to an electronic device according to some embodiments of the present invention.

Reference is now made to FIG. 2, which is a top schematic view of an apparatus for providing accessibility to an electronic device according to some embodiments of the present invention. The apparatus may include a user interface 100 that includes multiple user input devices 120A-C that are configured to receive physical inputs from a user. The user input devices 120A-C may generate a sensor output signal responsive to receiving the physical input from the user.

Some embodiments provide that the user input devices 120A-C are a force sensitive input devices that are configured to provide sensor output signals that vary corresponding to an amount of physical input force applied to the input device. In some embodiments, the force sensitive devices include force sensitive resistors that are configured to have an electrical resistance that changes responsive to changes in physical force applied to the input device. In such embodiments, a voltage divider circuit that includes a force sensitive resistor may be coupled to a processor 140. In some embodiments, the processor 140 can be an analog input processor 140. In this regard, the processor 140 may receive an input voltage signal that has a value that corresponds to the amount of force being applied to the user input device 120. In some embodiments, the user input devices 120A-C can be square, rectangular, round, or may have any other shape. In some embodiments, the user input devices 120A-C can be a single integrated input device. In some such embodiments, different portions of the single integrated input device can be configured such that when a user applies a physical force to a particular portion of the input device, a voltage signal corresponding to the particular portion of the input device is generated. In some embodiments, the user device can be a joystick, track-ball, slam switch or a sip and puff switch, or any other type of input device. In some embodiments, the apparatus can be configured to be coupled to one or more external input devices. In some such embodiments, the apparatus can include one or more device ports via which the input devices can be coupled to the apparatus.

Some embodiments provide that the user input devices 120A-C may include and/or be used in conjunction with one or more feedback devices 122. For example, user input devices 120A-C may include embedded piezo-electric sensors 122 that may be operable to vibrate in response to physical user input at the input devices to provide feedback to the user. In some embodiments, the user input devices 120A-C may be configured to allow a user to apply a force, which can be sensed by the feedback devices 122. The feedback devices 122 may then generate a sensor output signal corresponding to the force applied on the user input devices 120A-C. In some embodiments, each of the user input devices 120A-C corresponds to a separate feedback device 122. In this way, when a force is applied to one of the user input devices 120A-C, the feedback device 122 corresponding to that particular user input device 120A-C can generate a sensor output signal corresponding to the applied force.

In some embodiments, the input devices include three force sensitive resistors. Each of the resistors is wired to a voltage divider circuit, which is electrically coupled to a processor as inputs. The voltage divider circuit of an input device is configured to provide a sensor voltage signal that corresponds to the force applied to the input device.

The user input devices 120A-C may be mounted in and/or received by an interface housing 110. Some embodiments provide that the interface housing 110 is configured to support the user input devices 120A-C in a wearable device. In some embodiments, the interface housing 110 may be worn by the user on an arm and/or a leg via a sleeve 130 or other component for securing the apparatus to the user. For example, adjustable forearm sleeve 130 may be worn on the arm of a user and may support the interface housing 110. In some embodiments, the wearable device can include one or more adjustment straps that can adjust the size of the wearable device such that it fits snugly around an arm, leg or other portion of a user's limb. In some embodiments, the adjustment straps can include a hook and loop fastening mechanism, a buckle mechanism, or other fastening mechanism.

Figure 3A:
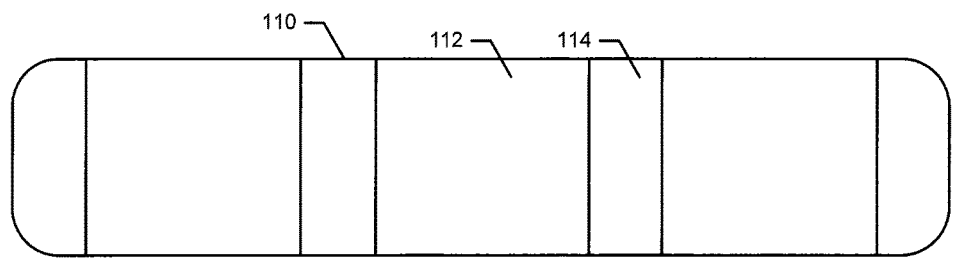
FIGS. 3A and 3B are top and end views of a wearable interface housing as illustrated in FIG. 2.
Figure 3B:
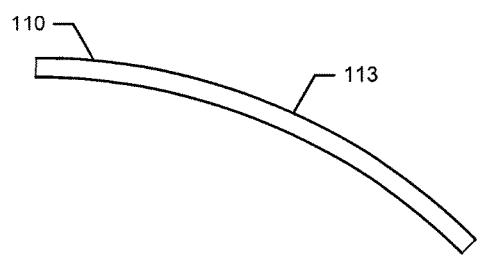

Brief reference is made to FIGS. 3A and 3B, which are top and end views of a wearable interface housing 110. Referring to FIG. 3A, the interface housing 110 includes one or more openings 112 that are configured to receive corresponding user input devices 120A-C. Although illustrated as including three openings corresponding to three user input devices 120A-C, the disclosure is not so limited. For example, embodiments described herein may include less than three openings/user input devices 112, 120 or more than three openings/user input devices 112, 120. Briefly referring to FIG. 3B, the interface housing 110 may include a curved base and may provide that the openings 112 include edges 113 the substantially the same height as a contact surface of the user input devices 120. In this manner, a swipe gesture including interacting with more than one of the user input devices may be performed smoothly.

Figure 4:
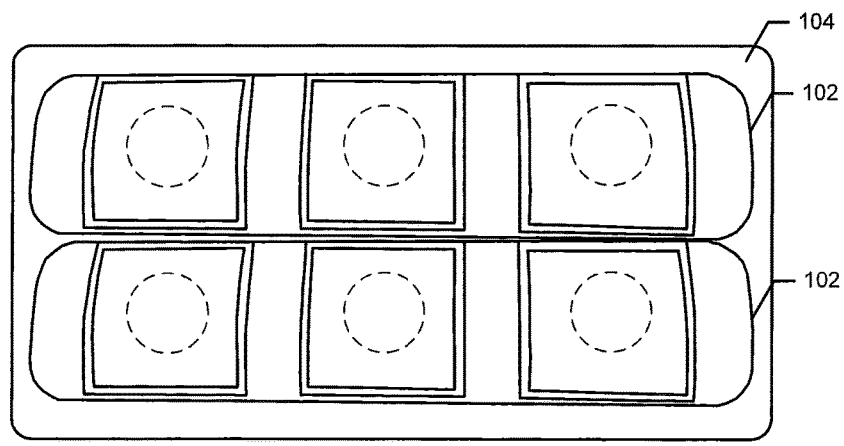
FIG. 4 is a top schematic view illustrating a multiple sensor module configuration according to some embodiments of the present invention.

Referring back to FIG. 2, a combination of the interface housing 110, the user input devices 120A-C and the corresponding feedback devices 122 may provide a sensor module 102 that may be reconfigurable and/or interconnected together with other sensor modules 102. Brief reference is made to FIG. 4, which illustrates the multiple sensor module configuration according to some embodiments of the present invention. As illustrated, one or more sensor modules 102 may be connected together and/or separated and mounted in a variety of configurations, including on the user body and/or in an environment, such as a table, floor, chair, and/or wheelchair, among others. In some embodiments, the sensor module's 102 may be mounted together on a single support surface 104 that may be adaptable to multiple different environments. In this manner, the apparatus for providing accessibility to an electronic device may be adapted based on the capability, range of access and/or range of motion of user.

Referring back to FIG. 2, the user interface 100 may include a processor 140 or other processing device. The processor 140 may be configured to receive one or more sensor output signals from the user input devices 120A-C and interpret the received signals as a gesture input signal that may be transmitted to an electronic device, such as a computer tablet 20. In some embodiments, the processor 140 may be configured to receive one or more sensor output signals from the feedback devices 122 corresponding to the user input devices 120A-C. The processor 140 may further be configured to process the received sensor output signals to generate gesture input signals. In some embodiments, the processor 140 may be configured to execute instructions to generate gesture input signals corresponding to the sensor output signals. In some embodiments, the processor 140 may be configured to execute instructions stored on a memory.

In some embodiments, the processor 140 can be configured to receive sensor output signals generated by feedback devices 122 or input devices 120A-C. The sensor output signals can be electrical voltage signals. In some embodiments, the feedback devices 122 or input devices 120A-C can be configured to generate analog sensor output signals that correspond to an amount of force applied to the input devices 120A-C.

In some embodiments, the sensor output signals may include digital signals. In such embodiments, if the force applied to the input devices exceeds a certain threshold, the feedback devices 122 or input devices 120A-C can generate a sensor output signal that indicates that a force is applied to the input devices 120A-C. In some embodiments, the input devices 120A-C can be mechanical switch devices that when actuated, can cause the sensor output signals to be generated. The mechanical switch devices can have a biasing force such that a sensor output signal can be generated only if the force applied to the mechanical switch devices is greater than the biasing force. In addition to the magnitude of the force, in some embodiments, the input devices 120A-C can be configured such that a sensor output signal is generated if a force applied to the input devices 120A-C exceeds a particular threshold time period. As such, accidental touches of the input devices 120A-C for a short period of time magnitude of the electrical voltage signals may not result in the generation of the sensor output signal as the amount of time for which the force is applied does not exceed the particular threshold time period. In some embodiments, the processor 140 can be configured to maintain a timing clock that is capable of determining a length of time for which a force is applied to an input device. In some embodiments, the processor 140 can be configured to start the timing clock when the processor 140 first receives a sensor output signal to the time the processor 140 no longer receives the sensor output signal.

In some embodiments, the processor 140 can be configured to receive separate output signals from separate feedback devices 122 or input devices 120A-C. The processor 140 can be configured to identify, based on the sensor output signals received from the input devices 120A-C, which of the input devices 120A-C is actuated. In some embodiments, each of the input devices 120A-C can generate a distinct sensor output signal, for example, having different voltages. For example, a first input device 120A can generate a sensor output signal of about 1V, the second input device 120B can generate a sensor output signal of about 0.5V and the third input device 120C can generate a sensor output signal of about 0.1V. In some embodiments, in which the sensor output signals are based on analog signals that correspond to the amount of force applied to the input devices 120A-C, the input devices 120A-C may be configured to generate analog sensor output signals having different voltage ranges. In this way, the processor 140 can be configured to determine the input device on which a force is applied as well as a relative magnitude of the force based on predefined voltage ranges known to the processor 140.

In some embodiments, the apparatus can be capable of being initialized and configured to meet the capabilities of individual users. As different users may apply different levels of force based on their physical condition, the processor 140 may be configured to run through a configuration process to determine a range of magnitudes of force that a user can apply to the input devices 120A-C. The processor 140 can then define voltage levels that correspond to the range of magnitudes of force.

In some embodiments, the processor 140 can be configured to determine the input device 120A-C to which the received sensor output signal corresponds. As described above, the processor 140 can be configured to determine the input device 120A-C based on the magnitude of the received sensor output signal. In particular, in some embodiments in which each of the input devices 120A-C generates a sensor output signal within a particular range of voltages, the processor 140 can determine the input device based on which range of voltages the magnitude of the received sensor output signal falls within. In some embodiments, the processor 140 can be configured to be coupled to each of the input devices 120A-C via separate connections. In some embodiments, the processor 140 can be configured to identify which input device 120A-C generated the received sensor output signal based on a connection/through which the processor 140 received the sensor output signal.

The processor 140 can be further configured to generate a gesture input signal in response to receiving a sensor output signal. In some embodiments, the processor 140 is configured to generate the gesture input signal in response to determining that the sensor output signal exceeds a threshold voltage. In some embodiments, the threshold voltage may be specific to the input device from which the sensor output signal was generated. In some embodiments, the processor 140 can be configured to interpret a sensor output signal based on one or more of the voltage of the sensor output signal or the amount of time for which the sensor output signal was received.

The processor 140 can be configured to interpret the sensor output signals received by the processor 140. To do so, in some embodiments, the processor 140 can be configured to identify characteristics of the sensor output signal, such as the voltage, the duration, the input device from which the sensor output signal was received, amongst others. Upon identifying the characteristics of the sensor output signal, the processor 140 can be configured to match the characteristics with a corresponding gesture input signal. In some embodiments, the processor 140 may be coupled to a memory, which stores a plurality of sensor output signal characteristics and gesture input signal characteristics that are associated with the sensor output signal characteristics. The processor 140 can be configured to identify the corresponding gesture input signal characteristics that are associated with the sensor output signal characteristics identified by the processor 140. The processor 140 is then configured to generate a gesture input signal based on the corresponding gesture input signal characteristics, which can be provided to the electronic device with which the apparatus is communicatively coupled.

In some embodiments, the processor 140 is further configured to generate a gesture input signal that corresponds to one or more sensor output signals generated by more than one of the input devices 120A-C. For example, if a user were to perform a gesture by swiping his finger across the three input devices 120A-C, each of the three input devices 120A-C can generate respective sensor output signals. In some embodiments, the processor 140 is configured to determine if a particular sensor output signal received by the processor 140 is part of multiple input device gesture, such as the finger swipe. In some embodiments, the processor 140 is configured to determine if the sensor output signals correspond to a sequence. In some embodiments, the memory can store characteristics of a sequence of sensor output signals. The processor 140 can be configured to determine if a plurality of sensor output signals received in sequence correspond to a particular sequence by comparing the characteristics of the sensor output signals with those stored in the memory. If there is a match, the processor 140 determines that the sensor output signals correspond to a particular gesture and the processor 140 generates a gesture input signal that indicates that the particular gesture was performed on the apparatus.

The user interface 100 may also include a battery 150 or other power supplying device that may provide electrical power to the processor 140 and/or other user interface 100 components. The battery 150 can be configured to provide a voltage to the various electrical components, such as the input devices 120A-C, the feedback devices 122, the processor 140, the device port 160 and a transceiver 165 of the apparatus. In some embodiments, the battery 150 can be coupled to the processor 140, which is further configured to power each of the other electrical components of the apparatus. In some other embodiments, the battery 150 can be configured to power each of the electrical components directly.

Some embodiments provide that the processor 140 may include a wired and/or wireless communication transceiver 165 integrated therein and that is configured to transmit the gesture input signal to be received by the electronic device. In some embodiments, the communication transceiver 165 may be a separate component from the processor 140 and may be communicatively coupled thereto. Some embodiments provide that wireless and/or wired communication may be provided between multiple different user interfaces 100 and one or more electronic devices. User interfaces 100 may include wired and/or wireless transceivers 165 that are capable of transmitting and receiving data to/from other user interfaces 100 and/or one or more electronic devices, such as computer tablets 20.

The user interface 100 may be accessible to multiple different switch devices, including other types of user input devices such as joysticks, trackball, touchpads, etc. In some embodiments, switch devices may be wirelessly connected via, for example, the transceiver 165. Some embodiments provide that the switch devices may be connected via one or more device ports 160 that may be separate from and/or integrated into the processor 140. As illustrated, connectivity of the different components of the user interface may be provided through wires and/or other electrically conductive media.

Some embodiments provide that the electronic device (e.g., computer tablet 20) is configured to wirelessly receive the gesture input signal from the user interface 100. The computer tablet 20 may include computer readable program code that, when executed by a processor in the computer tablet 20, interprets the received gesture input signal to control the computer tablet 20. Such code may be implemented using a variety of software applications.

In some embodiments, the software applications may be configured to generate a graphical user interface that visually corresponds to an arrangement of the user input devices 120A-C in the user interface 100. For example, the user interface 100 may include an array of the user input devices 120A-C that are arranged in an input layout pattern. The graphical user interface may be configured to generate a graphical representation that includes the input layout pattern. In this manner, intuitive control of the computer tablet 20 may be provided.

The received gesture input signals may be interpreted by the software application(s) to control the computer tablet 20 via the graphical user interface. The gesture input signals may correspond to actuation of one of the user input devices 120A-C and the software application may execute and/or perform an operation that corresponds to the actuation of the user input device 120. In some embodiments, a gesture input signal may correspond to a sequence of actuation of more than one of the user input devices 120. The sequence may be interpreted as a swipe gesture and the software application may execute and/or perform an operation that corresponds to the swipe gesture. In some embodiments, an order of the actuation of the user input devices 120 may identify the sequence as corresponding to either a forward swipe or a reverse swipe. In some embodiments, the software application may be configured to receive gesture input signals from the apparatus and interpret the gesture input signals to correspond to a particular gesture, such as a swipe. In some embodiments, different software applications can be configured to define a particular gesture, instead of relying on predefined gestures that are predefined in the apparatus. As such, if a user swipes across the three input devices, the processor of the apparatus can be configured to transmit three gesture input signals corresponding to the three input devices being pressed sequentially. The software application may be configured to interpret the three gesture input signals to correspond to the swipe gesture.

Some embodiments provide that three user input devices 120A-C are arranged in a row in the user interface 100 and the graphical user interface that visually corresponds to the arrangement includes graphical representation of one or more rows, each including three graphically generated buttons corresponding to the three user input devices. In such embodiments, a user selection of one of the user input devices 120 on a highlighted row of the graphical user interface may cause a function corresponding to that button to be performed. In contrast, a swipe gesture, which may include the actuation of more than one of the user input devices 120, may result in a different one of the rows of graphically generated buttons to be highlighted on the graphical user interface.

Figure 5:
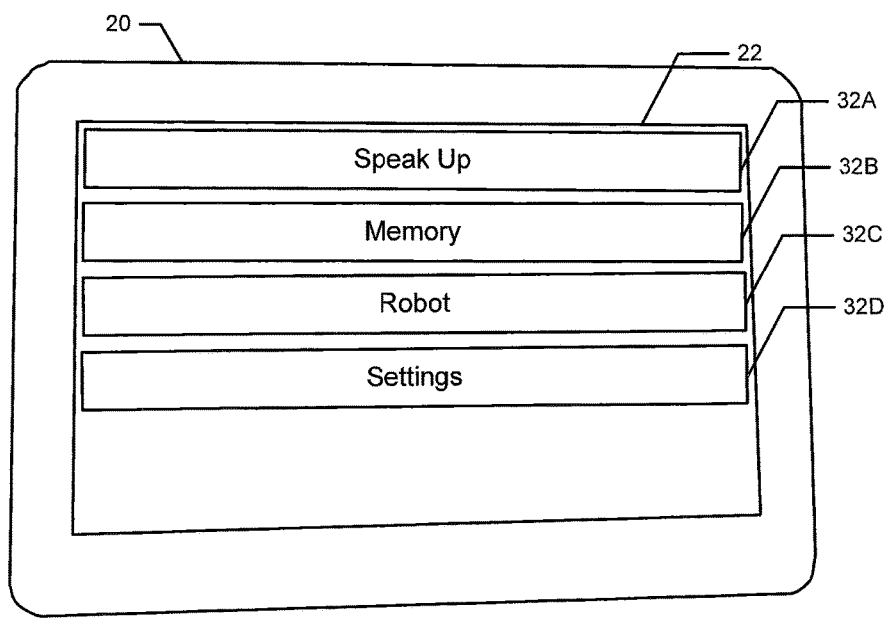
FIG. 5 is an illustration of an example screen shot of a menu screen of a graphical user interface application according to some embodiments of the present invention.
Figure 6:
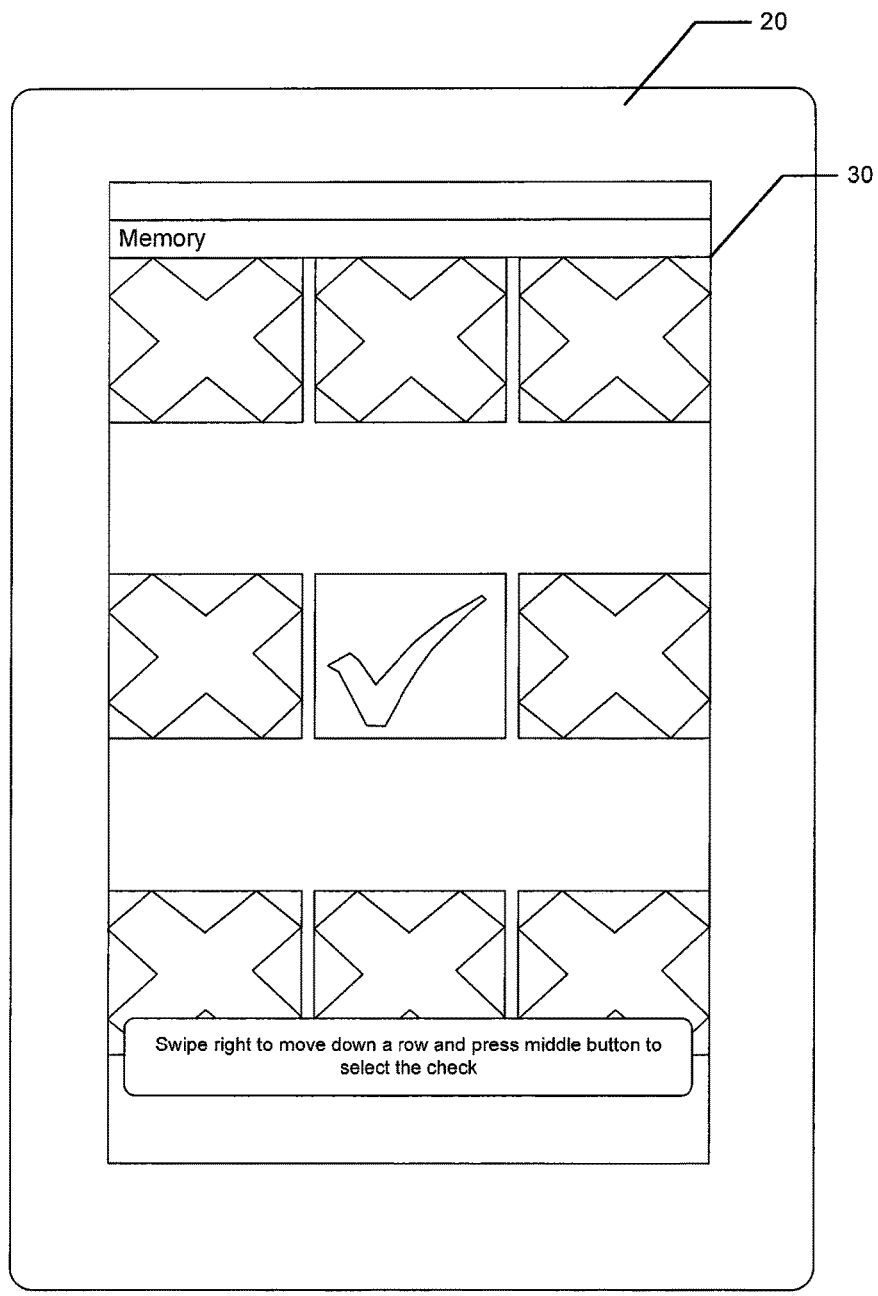
FIG. 6 is an illustration of an example screen shot of a game application according to some embodiments of the present invention.

Reference is now made to FIG. 5, which is an illustration of an example screen shot of a menu screen of a graphical user interface application according to some embodiments of the present invention. As illustrated the computer tablet 20 includes a display 22 that is configured to display a graphical user interface corresponding to an application 30. The graphical user interface may include user input regions implemented as software generated buttons 32 that, when actuated, cause the computer tablet 20 to perform various operations. For example, a "Speak Up" button 32A may cause the computer tablet 20 to launch an application called "Speak Up". A "Memory" button 32B may cause the computer tablet 20 to launch an application for a memory game. For example, brief reference is made to FIG. 6, which is an illustration of an example screen shot of a memory game application according to some embodiments of the present invention.

In some embodiments, the apparatus can be configured to be used with a software application executing on a computing device. For example, the apparatus can be configured to be used with a speech improvement software application, through which the user can learn simple phrases. The software application can be configured to display, via a graphical user interface, a plurality of icons corresponding to different phrases. The user navigates the application via the input devices of the apparatus and selects an input device corresponding to an icon displayed on the graphical user interface. In some embodiments, the graphical user interface can be configured such that each of the input devices corresponds to one of the icons displayed on the graphical user interface. In some embodiments, the user may be able to select an icon by actuating the corresponding input device on the apparatus. If the icon the user wishes to select is not currently available for selection, the user can perform a gesture, such as a swipe, on the apparatus such that the graphical user interface presents a new set of icons that can be selected. In some embodiments, the quantity of icons that can be selected at any given time can equal the quantity of input devices of the apparatus.

In some embodiments, the software application can be a memory game that tests the user's memory. In some embodiments, the memory game can be similar to a classic card game in which a player has cards with pictures on them, all lying face down. The player then turns over a card to reveal the picture and then tries to locate the matching card. Once all the cards have been matched, the player has won the game. When implementing this game with the use of the apparatus as an input means, the software application can be configured to match the apparatus with which the user can provide inputs. For example, if the apparatus includes three buttons, the software application can provide the cards in rows that include three cards. At any given time, the user can select a card from a highlighted row. In this way, the user can select a card from a particular row by actuating one of the input devices. If the player would like to select a card from another row, the player may have to perform a gesture, such as a swipe, to cause another row of cards to be highlighted. Once the row having the card the player wishes to select is highlighted, the player can actuate the input device of the apparatus that corresponds to the particular card in order to select the card.

Figure 7:
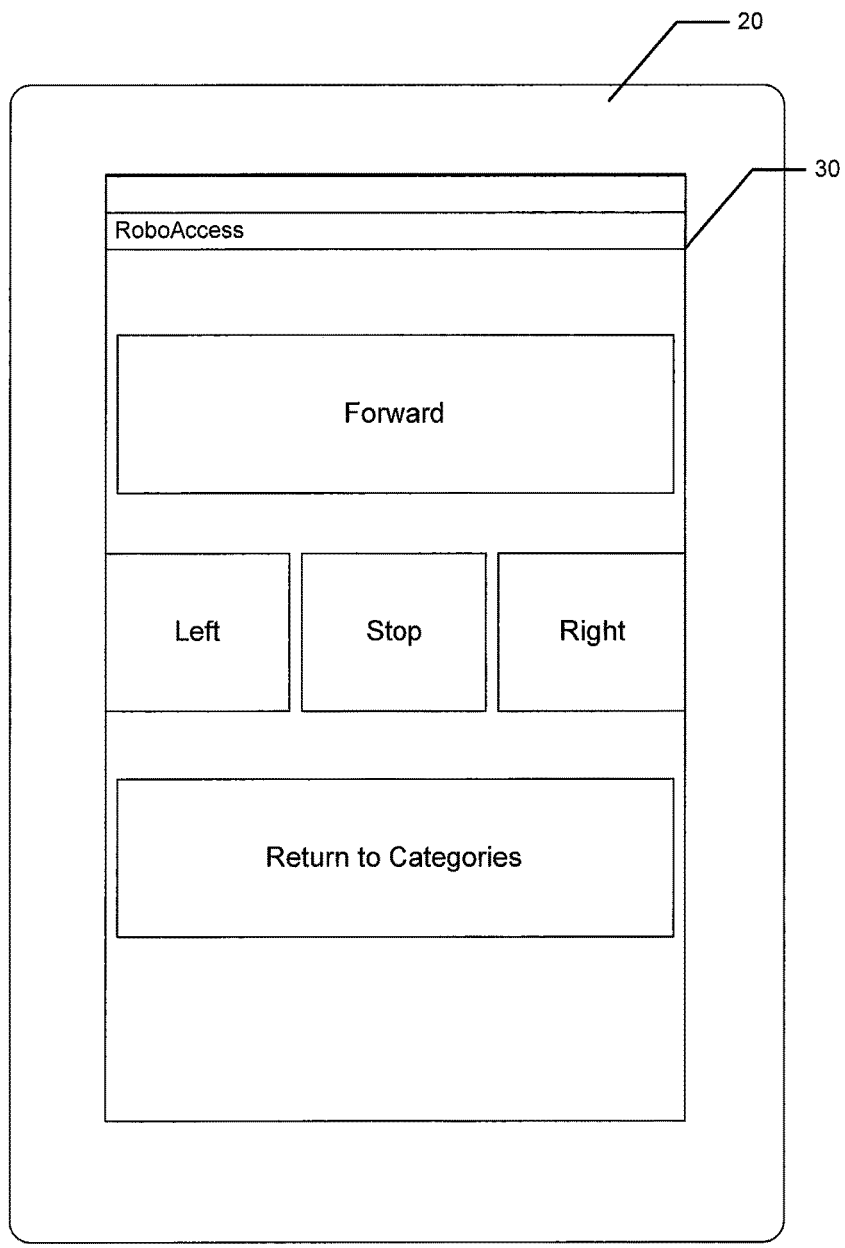
FIG. 7 is an illustration of an example screen shot of a robot control application according to some embodiments of the present invention.

Referring back to FIG. 5, in yet another example, a "Robot" button 32C may cause the computer tablet 20 to launch an application for a robot control user interface. Brief reference is made to FIG. 7, which is an illustration of an example screen shot of a robot control application according to some embodiments of the present invention. The robot control application may be used to generate mobile device commands that are responsive to gesture input signals received by the electronic device. The mobile device commands may be received by a remote mobility device 200 that is operable to move responsive to receipt of the mobile device commands. For example, the remote mobility device may include a robot. Additionally, a "Settings" button 32D may cause the computer tablet 20 to launch a user interface to access the settings of the device and/or system. In some embodiments, each of the buttons 32A-32D can be selected by a user via the input devices 120A-C of the apparatus. In some embodiments, the graphical user interface can indicate which gesture to perform on one or more of the input devices of the apparatus to select the buttons 32A-32D.

As discussed herein, the user interface 100 may include a processor 140 that interprets sensor output signals generated responsive to a user providing inputs to the user input devices 120 to generate gesture input signals for the computer tablet 20. In some embodiments, the processor can be configured to execute a gesture recognition algorithm. The gesture recognition algorithm include one or more instructions, that when executed by the processor, can generate a gesture input signal that corresponds to one or more sensor output signals generated by the input devices. The gesture recognition algorithm is configured to identify one or more gestures performed by a user on or via the input device. In some embodiments, the gesture recognition algorithm is configured to identify gestures based on the amount of force applied at the input devices, the duration of the application of the force and the timing and sequence at which the forces are applied at the input devices. In some embodiments, interpreting the sensor signals into gesture signals may include reading the analog voltage corresponding to each of the user input devices 120. The sensor signal voltage may be compared to a threshold voltage to determine if the corresponding user input device is being actuated. Based on the comparison, each of the analog inputs may be categorized into discrete states (e.g., "button pressed" or "button released"). Some embodiments provide that the states of the inputs can be used as inputs into a finite state machine to determine what the corresponding gesture is. For example, in the case of three user input devices 120A-C, the finite state machine may interpret at least five different gestures including one gesture corresponding to actuation of a single input, a forward swipe, or a backward swipe. In addition, the finite state machine may implement a time factor to recognize gestures. As such, the finite state machine may interpret pressing one of the input devices in quick succession (similar to a double click of a mouse button) as a gesture. In addition, if a particular input device is pressed for a period of time that exceeds a threshold period of time, the finite state machine may interpret such an action as another gesture. In this way, the finite state machine can be configured to interpret a large number of actions as gestures even though only a small number, for example, three, of input devices are included in the apparatus.

Figure 8:
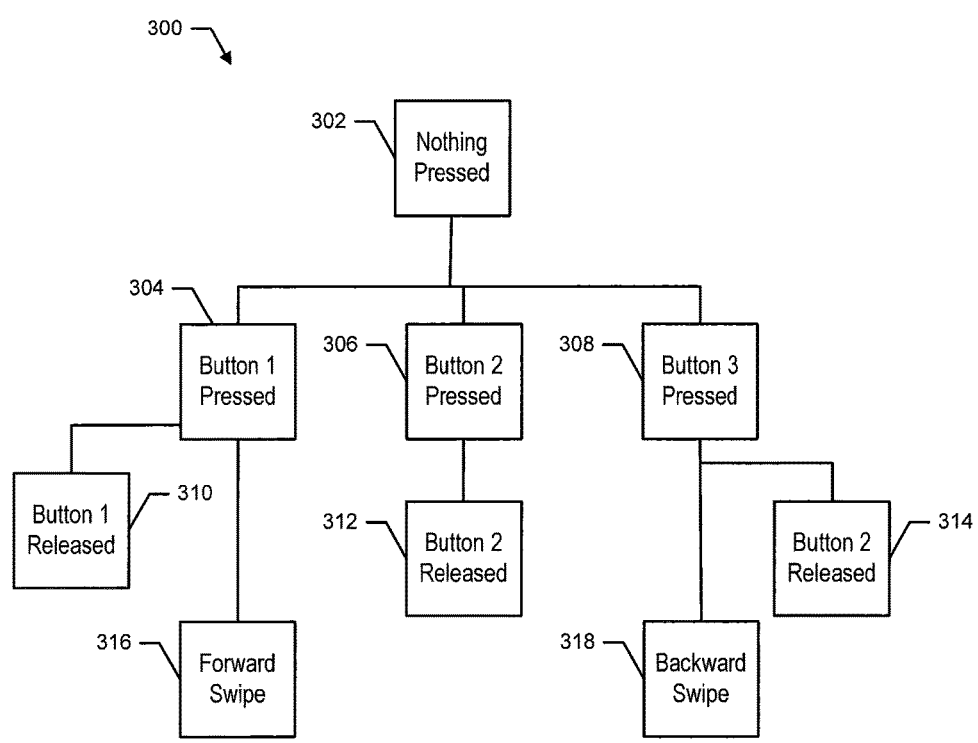
FIG. 8 is a flow diagram illustrating gesture interpretation using a finite state machine according to some embodiments of the present invention.

Brief reference is now made to FIG. 8, which is a flow diagram illustrating gesture interpretation using a finite state machine according to some embodiments of the present invention. As illustrated, the input states may include nothing pressed (block 302), button 1 pressed (block 304), button 2 pressed (block 306) and button 3 pressed (block 308). The other state's of each of the three buttons being released may be considered in determining whether the gestures are individual actuations or a forward or backward swipe. Additionally, as described above, interpreting the gestures may also include determining the time duration corresponding to one or more changes in states.

Figure 9:
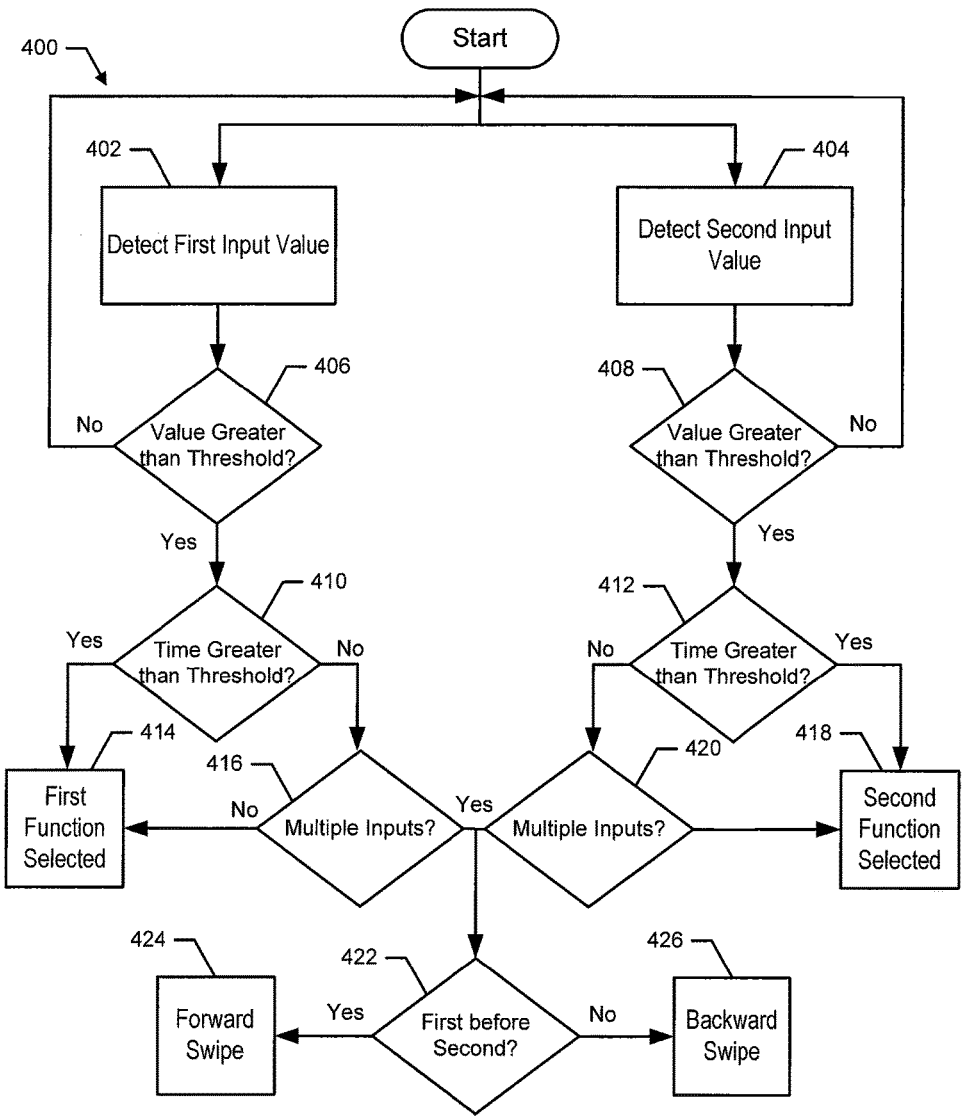
FIG. 9 is a flow diagram illustrating operations corresponding to generating gesture signals according to some embodiments of the present invention.

Reference is now made to FIG. 9 is a flow diagram illustrating operations corresponding to generating gesture signals according to some embodiments of the present invention. The example of FIG. 9 includes reference to a user interface including at least two user input devices. In brief overview, a first input value is detected (block 402) and a comparison is made to determine if the first input value exceeds a threshold value (block 406). If the first input value does not exceed the threshold value then the first input value is not considered as representing a user input device actuation. If the first input value does exceed the threshold value then determination as to whether the duration of the first input value being above the threshold value is greater than a time threshold (block 410).

Some embodiments provide that the duration may be determined by using one or more timer functions to determine input durations and/or the differences between input state changes. If the duration of the first input value is greater than the threshold value for a duration that exceeds the time threshold, then the first function that corresponds to the first input is selected (block 414). Some embodiments provide that this may represent the circumstance where the actuation of the first user input device is performed in a substantially static manner directed solely at the first user input device with no intentional lateral movement towards the other user input device.

In contrast with the actuation of a single user input device, intentional lateral movement directed at more than one user input device may result in shorter duration actuation of a user input device. In this regard, a shorter duration actuation of the first user input device may be indicative of a swipe gesture. Thus, if the duration of the first input value is greater than the threshold value for a duration that does not exceed the time threshold, then a determination as to whether multiple user input device inputs are received may be made (block 416). The absence of multiple inputs may indicate that there is no swipe gesture and thus the first function may be selected (block 414).

As illustrated, similar operations that are described above regarding the processing of the first input value in blocks 402, 406, 410, 414, and 416 may be performed for the second input value as shown in corresponding blocks 404, 408, 412, 418 and 420. As such, repetitive description thereof will be omitted. If multiple inputs are received (blocks 416, 420) then the gesture may be interpreted as a forward swipe gesture 424 or a backward swipe gesture 426 based on the determination of whether the first input value was detected before the second input value (block 422). The operations described herein are representative of a non-limiting embodiment for interpreting the sensor signals to generate a gesture input signals. As such, other operations, orders of operation, quantities of user input devices and interpretation algorithms are contemplated herein.

In further detail, an apparatus, such as the apparatus shown in FIG. 2, detects a first input value (block 402). In some embodiments, a first input value is detected in response to force being applied to a first input device of the apparatus. In some embodiments, a processor of the apparatus is configured to periodically check to see if an input signal is detected. In some embodiments, the processor can be configured to sense a change in the voltage applied to an input port of the processor. As a first input value is generated due to force being applied to an input device, an electrical voltage signal is generated. The processor is coupled to the input device such that when the electrical voltage signal is generated, the processor of the apparatus can detect the electrical voltage signal, which corresponds to the first input value.

Upon detecting the first input value, the apparatus can determine if the first input value is greater than a threshold (block 406). In some embodiments, the first input value can be an electrical voltage signal having a particular magnitude. The apparatus can determine if the magnitude of the electrical voltage signal exceeds a threshold voltage. The threshold voltage can correspond to a minimum actuation force that needs to be applied to the input device for the apparatus to recognize the applied force as an action. This can prevent the apparatus from interpreting inadvertent or accidental touches of the input device as actual gestures being performed by a user. In some embodiments, the threshold voltage can be defined during an initialization stage that is specific to a particular user. In some other embodiments, the threshold voltage can be predefined. If the first input value does not exceed the threshold, the apparatus ignores the first input value.

In addition, the apparatus can determine if the first input value is provided for a duration that is greater than a threshold duration (block 410). The duration of the first input value can be determined by starting a timer when the first input value is first detected and stopping the timer once the first input value is no longer detected. If the duration of the first input value exceeds a threshold duration, the apparatus determines that a first function is selected (block 414). However, if the duration of the first input value does not exceed a threshold duration, the apparatus queries whether the first input value corresponds to a multiple input-based gesture (block 416). The apparatus can determine that the first input value corresponds to multiple input-based gesture if a second input value is detected within a threshold time period before or after the first input value is detected. In some embodiments, the threshold time period can be determined during an initialization stage in which the user is prompted to swipe the input devices in a forward direction and a backward direction. Based on the speed of the swipe, and consequently, the speed at which the first and second input devices are actuated, the apparatus can determine a threshold time period based on the difference in time between the actuation of the first input device and the second input device. If the first input value does not exceed the threshold duration and no other input value is detected by the apparatus, the apparatus determines that the first input value is selected (block 414).

The apparatus can also detect a second input value (block 404). Similar to the first input value being detected in response to force being applied to a first input device of the apparatus, the second input value can be detected in response a force being applied to a second input device of the apparatus. A sensor of the apparatus senses the applied force and generates an electrical voltage signal that corresponds to the second input value, which can be detected by the processor of the apparatus. The apparatus can similarly determine if the second input value exceeds a threshold value (block 408). If the second input value does not exceed the threshold, the apparatus ignores the second input value. Moreover, the apparatus can similarly determine if the second input value is provided for a duration that is greater than a threshold duration (block 412). The duration of the second input value can be determined by starting a timer when the second input value is first detected and stopping the timer once the second input value is no longer detected. If the duration of the second input value exceeds a threshold duration, the apparatus determines that a second function is selected (block 418). However, if the duration of the second input value does not exceed a threshold duration, the apparatus queries whether the second input value corresponds to a multiple input-based gesture (block 420). The apparatus can determine that the second input value corresponds to multiple input-based gesture if another input value, such as the first input value, is detected within a threshold time period before or after the second input value is detected. If the second input value does not exceed the threshold duration and no other input value is detected by the apparatus, the apparatus determines that the second input value is selected (block 418).

If the apparatus determines that a first input value and a second input value were revived within a particular time period of one another, the apparatus determines if the first input value was detected before the second input value (block 422). If the apparatus determines that the first input value was detected before the second input value, the apparatus determines that the gesture is a forward swipe. Conversely, if the apparatus determines that the first input value was detected before the second input value, the apparatus determines that the gesture is a backward swipe.

Figure 10:
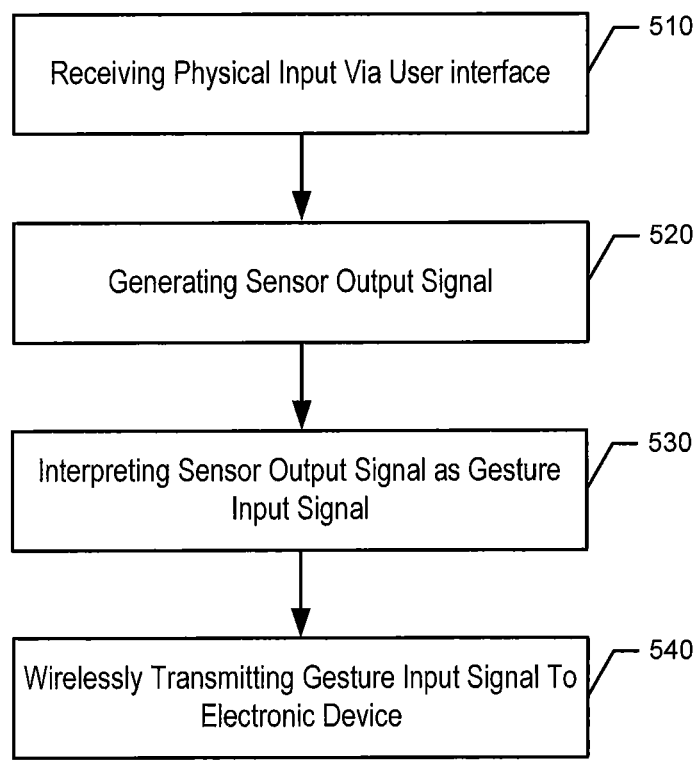
FIG. 10 is a flow diagram illustrating operations corresponding to systems, methods, computer program products and apparatus according to some embodiments of the present invention.

Reference is now made to FIG. 10, which is a flow diagram illustrating operations corresponding to systems, methods, computer program products and apparatus according to some embodiments of the present invention. Operations may include receiving a physical input via at least one user input device in a user interface (block 510). In some embodiments, a user input device may include a force sensitive resistor that is configured to have an electrical resistance that changes responsive to changes in physical force applied thereto. A sensor output signal may be generated in the user interface responsive to receiving the physical input from the user (block 520). Some embodiments provide that generating the sensor output signal includes generating a variable value that corresponds to an amount of physical input force applied to a corresponding user input device. In some embodiments, a processor may be configured to receive one or more sensor output signals from feedback devices 122 corresponding to the user input devices. In some embodiments, the input devices can cause a sensor output signal to be generated when a force is applied to the input devices. In some embodiments, the processor can be configured to receive separate sensor output signals from separate input devices.

The sensor output signal may be interpreted as a gesture input signal that that is received by the electronic device (block 530). In some embodiments, the sensor output signal may be interpreted as a gesture input signal in accordance with the method described in FIG. 9. The processor can be configured to identify, based on the magnitude of sensor output signals received from the input devices as well as the duration of each of the sensor output signals, one or more gestures performed by the user on the input devices of the apparatus. In some embodiments, the gesture recognition algorithm identifies the one or more detected sensor output signals and determines one or more characteristics of the sensor output signals received. The processor then determines if the characteristics correspond to one or more stored characteristics of known gestures. If the processor determines a match, the processor identifies the gesture with which the sensor output signals correspond. The processor then generates a gesture input signal that corresponds to one or more of the sensor output signals received.

The gesture input signal may be wirelessly transmitted from the user interface to the electronic device (block 540). The gesture input signal may be operative to cause the electronic device to perform a function that might otherwise be performed by physically interfacing with the electronic device. In this manner, the user may control the electronic device using the user interface.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

In some embodiments, the software applications configured to execute on the computing device, such as the tablet 20 shown in FIG. 1 can be constructed using software constructs, such as classes or objects. In some embodiments, the software applications can be based on an architectural design pattern that separates interactions between users and application into the roles of model, view and controller. An example of such an architectural design pattern is the Model View Controller.

In some embodiments, the top level of a software application is referred to as the view. The view is what users of the application see. The view can be designed with multiple rows, with each row including a maximum number of selectable icons. For example, the maximum number of selectable icons can be three to correspond with the number of input devices on the apparatus through which the user can interact with the software application. When using the apparatus, a row can be brought into focus by setting the transparency of all other rows to 50%. In order to bring another row into focus, the user can swipe in either direction and the row in focus on the application will change. When developing an application, the developer can use XML files to layout the UI of their application. The application requires a specific structure to maintain familiarity between applications. To do this, the application has one layout, and provides a specific class, such as a TableLayout class, which allows an application to organize selectable icons in the view. The application also provides an abstract Button class, which enhances the functionality of a normal button or selectable icon, and links the button into the application. Each application can write its own view class and inherit from the abstract Button class to allow buttons to be placed into the TableLayout. The benefit of having each application with its own Button class is the ability to integrate well with the Models provided by the application.

In some embodiments, Models are a way for the View to use information stored within an application. A Model stores, organizes, and provides the view with necessary data. The application uses models to handle various resources for use with the View. There can be three models in the application for audio, images, and text-to-speech. Each view can use the model to enhance its looks and functionality. For example, to set an image background for a button, the Button class can use an image model. The Model provides a front-end for use with a Controller.

In some embodiments, the Controller may be the heart of every application within the application. Android refers to controllers as "Activities." Each activity is an inference agent that determines what is going on in the application, and communicates with the View to change what the user sees. The application provides an abstract controller for each application to inherit from. This abstract controller is responsible for initializing and maintaining a Bluetooth connection to the apparatus, as well as providing general functionality for each activity to receive commands from the apparatus. The application also provides a way for each application controller to add and remove buttons from the View. The application provides an API for developers to easily create new applications within the application without needing a deep understanding of its inner workings and communication with the apparatus.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

That which is claimed is:

1. An apparatus for providing accessibility to an electronic device, the apparatus comprising:
   a plurality of user input devices, each of which comprises a mechanical switch device, and each of which is configured to receive a physical input from a user via actuation of the mechanical switch device and to generate a respective sensor output signal responsive to the actuation, resulting in a plurality of sensor output signals;
   a processing device that is configured to receive the plurality of sensor output signals and to interpret the plurality of sensor output signals as a single gesture input signal that is transmitted to the electronic device, wherein the single gesture input signal corresponds to a sequence of actuation of the plurality of the mechanical switch devices, the sequence of actuation being interpreted as a forward swipe gesture input signal or a backward swipe gesture input signal;
   a sensor module that includes an interface housing that is dimensioned to receive the plurality of user input devices; and
   an adjustable sleeve that supports the sensor module and the processing device and that is configured to be worn on a forearm of the user,
   wherein the single gesture input signal is configured to cause the electronic device to change which row of a plurality of rows is highlighted in a graphical user interface generated by the electronic device, wherein the graphical user interface comprises a graphical representation of the plurality of rows, wherein each of the plurality of rows comprises a plurality of graphically generated buttons that respectively correspond to the plurality of user input devices.

2. The apparatus according to claim 1, wherein at least one of the plurality of user input devices comprises a force sensitive input device that is configured to provide the respective sensor output signal as a variable value that corresponds to an amount of physical input force applied to the force sensitive input device by the user.

3. The apparatus according to claim 2, wherein the force sensitive input device comprises a force sensitive resistor that is configured to have an electrical resistance that changes responsive to changes in physical force applied thereto.

4. The apparatus according to claim 3, further comprising a voltage divider circuit that comprises the force sensitive resistor therein and that is coupled to an analog input of the processing device, wherein as the physical force is applied to the force sensitive resistor a voltage value applied to the analog input of the processing device coupled to the voltage divider circuit changes responsive thereto.

5. The apparatus according to claim 1, wherein at least one of the plurality of user input devices comprises at least one of a joystick, track-ball, slam switch or a sip and puff switch.

6. The apparatus according to claim 1, wherein the interface housing comprises a curved base and a plurality of openings that are dimensioned to receive corresponding ones of the plurality of user input devices.

7. The apparatus according to claim 6, wherein the plurality of openings include edges that are substantially a same height as a contact surface of corresponding ones of the plurality of user input devices when the plurality of user input devices are mounted therein.

8. The apparatus according to claim 1, further comprising a wireless communication transmitter that is communicatively coupled to the processing device and that is configured to wirelessly transmit the single gesture input signal to be received by the electronic device.

9. The apparatus according to claim 1, wherein the interface housing comprises connection ports configured to be coupled to an external input device.

10. The apparatus according to claim 1, further comprising a plurality of feedback devices corresponding to the plurality of user input devices, ones of the plurality of feedback devices configured to provide a tactile feedback to a user corresponding to receiving the physical input from the user.

11. The apparatus according to claim 1, wherein the electronic device comprises a computer tablet device that is configured to wirelessly receive the single gesture input signal, and
wherein the computer tablet device comprises computer readable program code stored therein that, when executed by a processor in the computer tablet device, interprets the received single gesture input signal to control the computer tablet device.

12. A computer program product comprising:
a non-transitory computer readable storage medium having computer readable program code embodied in the medium, the computer readable program code comprising:
computer readable code to generate, in an electronic device, a graphical user interface that visually corresponds to an arrangement of a plurality of user input devices mounted in a wearable user interface, wherein each user input device comprises a mechanical switch device, wherein the wearable user interface is configured to convert user actuation of a plurality of the mechanical switch devices into a single gesture input signal that is transmitted to the electronic device; and
computer readable code to interpret the received single gesture input signal as an input to control the electronic device,
wherein the computer readable code to interpret the received single gesture input signal as an input to control the electronic device comprises computer readable code to interpret that the received single gesture input signal corresponds to a sequence of actuation of the plurality of the mechanical switch devices, the sequence of actuation being interpreted as a swipe gesture, further comprising computer readable code to execute an operation that corresponds to the swipe gesture,
wherein the plurality of user input devices in the wearable user interface comprises three user input devices that are arranged in a row in the wearable user interface,
wherein the graphical user interface that visually corresponds to the arrangement of the plurality of user input devices in the wearable user interface comprises a graphical representation of a plurality of rows of graphically generated buttons, each of the plurality of rows of graphically generated buttons comprising three graphically generated buttons corresponding to the three user input devices, and
wherein the computer readable code that executes the operation corresponding to the swipe gesture comprises computer readable code to change which of the plurality of rows of graphically generated buttons is highlighted responsive to a forward swipe or a backward swipe.

13. The computer program product according to claim 12, wherein the plurality of user input devices are mounted in the wearable user interface in an input layout pattern, and
wherein the computer readable code to generate, in the electronic device, the graphical user interface comprises computer readable code to generate a graphical representation that includes the input layout pattern.

14. The computer program product according to claim 12, wherein an order of the actuation of the plurality of the mechanical switch devices identifies the sequence of actuation as corresponding to either the forward swipe or the backward swipe.

15. The computer program product according to claim 12, further comprising computer readable code to generate mobile device commands that are responsive to the received single gesture input signal, wherein the mobile device commands are configured to be received by a remote mobility device that is operable to move responsive to receipt of the mobile device commands.

16. The computer program product according to claim 15, wherein the remote mobility device comprises a robot and wherein the graphical user interface comprises a robot control application.

17. A method of providing user accessibility to an electronic device, the method comprising:
receiving actuations of mechanical switch devices, each mechanical switch device arranged in a respective one of a plurality of user input devices mounted in a wearable user interface that is supported by an adjustable sleeve configured to be worn on a forearm of a user, wherein the plurality of user input devices in the wearable user interface comprises at least two user input devices that are arranged in a row in the wearable user interface;

generating, by a processor within the wearable user interface, a sensor output signal responsive to receiving each respective physical input, resulting in a plurality of sensor output signals; and interpreting the plurality of sensor output signals as a single gesture input signal that is received by the electronic device, the single gesture input signal being operative to cause the electronic device to perform a function corresponding to a gesture physically inputted to the electronic device, wherein interpreting the plurality of sensor output signals as the single gesture input signal that is received by the electronic device comprises interpreting that the single gesture input signal corresponds to a sequence of actuation of the plurality of the mechanical switch devices, the sequence of actuation being interpreted as a swipe gesture, and wherein the function corresponding to the gesture physically inputted to the electronic device comprises changing, in a graphical user interface having a plurality of rows of graphically generated buttons, which of the plurality of rows of graphically generated buttons in the graphical user interface is highlighted, wherein each row of the graphically generated buttons comprises at least two graphically generated buttons, and wherein each row of the graphically generated buttons visually corresponds to an arrangement of the plurality of user input devices mounted in the wearable user interface.

18. The method according to claim 17, wherein generating at least one of the sensor output signals comprises generating a variable value that corresponds to an amount of physical input force applied to at least one of the user input devices.

19. The method according to claim 17, wherein at least one of the user input devices comprises a force sensitive resistor that is configured to have an electrical resistance that changes responsive to changes in physical force applied thereto.

20. The method according to claim 17, further comprising wirelessly transmitting the single gesture input signal from the wearable user interface to the electronic device.

* * * * *